United States Patent [19]

Plahmer

[11] Patent Number: 4,620,185
[45] Date of Patent: Oct. 28, 1986

[54] WEARING PART DIAGNOSTIC SYSTEM EMPLOYING TRACER ELEMENTS

[75] Inventor: Thomas G. Plahmer, Waukesha, Wis.

[73] Assignee: Rexnord Inc., Milwaukee, Wis.

[21] Appl. No.: 721,097

[22] Filed: Apr. 8, 1985

[51] Int. Cl.⁴ ............................................. G08B 21/00
[52] U.S. Cl. ........................................ 340/682; 73/64; 73/119 R; 116/208; 324/71.1; 340/59
[58] Field of Search ................ 340/682, 59; 324/71.1; 73/64, 119 R; 116/208, 28 R

[56] References Cited

U.S. PATENT DOCUMENTS

| | | | |
|---|---|---|---|
| 2,315,845 | 4/1943 | Ferris | 250/107 |
| 2,808,563 | 10/1957 | Hornbostel | 340/682 |
| 2,939,011 | 5/1960 | Bisso et al. | 250/83 |
| 3,228,735 | 1/1966 | Stewart | 116/208 |
| 3,678,883 | 7/1972 | Fischer | 175/39 |
| 4,029,554 | 6/1977 | Ellison | 324/71.1 |
| 4,169,677 | 10/1979 | Luria | 356/70 |
| 4,364,032 | 12/1982 | Narato et al. | 340/679 |
| 4,492,461 | 1/1985 | Jones et al. | 73/64 |

*Primary Examiner*—Glen R. Swann, III
*Attorney, Agent, or Firm*—Lawrence J. Crain

[57] ABSTRACT

A machine condition diagnostic system is provided wherein machine components are labelled with indicator materials. A normal level of indicators in the lubricant will be established. The lubricant is monitored and periodically or continually sampled to determine the presence of abnormal levels in the amount of indicator material. Since each component or components performing a similar function will be labelled with the same indicator, the presence of a particular indicator in abnormal amounts in the lubricant will direct the machine operator to the precise location requiring repair or replacement.

12 Claims, 5 Drawing Figures

WEARING PART DIAGNOSTIC SYSTEM EMPLOYING TRACER ELEMENTS

BACKGROUND OF THE INVENTION

The present invention relates to a system for monitoring the vital signs of heavy machines, and specifically relates to a system for monitoring the level of indicator materials in the lubricant to pinpoint the location of malfunctioning machine components.

The maintenance of heavy machinery has traditionally been an expensive and time consuming operation. Modern production schedules often require these machines to be in operation for extended periods of time, and often continuous operation is required. Consequently, preventive machine maintenance has evolved from a process practiced only by the more progressive machine operators, to a requirement of all profit minded operators.

An example of how preventive machine maintenance can affect the economics of machine operation is found in the process machinery industry, which provides heavy duty machines such as rock crushers used in mining and road building.

Bearing failure is a major cause of rock crusher breakdown, and is also a major source of maintenance expenditures in this industry. It normally takes from 50 to 100 man hours to dismantle a rock crusher in order to change worn bearings, each of which may be very costly. In an effort to minimize maintenance costs due to malfunctioning bearings, manufacturers have developed methods of monitoring the bearing condition to predict and minimize machine breakdowns due to bearing failure.

There are several indicia of machine condition which can be monitored to predict and prevent bearing failure. The following examples will be provided in the context of a rock crusher, however, the same principles can be used for most types of production machinery. For machines having an internal bearing lubrication system, means have been developed to measure lubricant temperature in various parts of the machine to detect differences in lubricant temperature which indicate excessive friction. If the temperature differential exceeds a pre-set threshold, some kind of alarm signal will be triggered. Similarly, lubricating or hydraulic oil pressure can be monitored to detect machine malfunctions by activating an alarm if oil pressure falls below a pre-set figure. Machine vital signs can further be monitored by the use of a sensing device which measures the revolutions per minute of various moving parts to ensure that shaft speed is maintained within desired limits. A slow moving shaft may indicate excess friction caused by a worn bearing. Sensing devices have also been developed to measure electric motor power draw and the level of lubrication oil in a holding tank. These sensing systems can be either manually or automatically monitored.

A major drawback of the above-mentioned sensing systems is that although machine failure can be detected and prevented, it has previously been impossible to ascertain the exact location of the malfunctioning component. Thus, when any or all of the above-mentioned sensing devices become activated, normally large portions of the affected machine must be dismantled to discover and repair or replace malfunctioning machine components.

Consequently, there is a definite need for a machine maintenance system which is capable of both monitoring machine condition and pinpointing the exact location of the malfunctioning element. This problem is especially critical in the area of machine bearing maintenance.

It is therefore a major objective of the present invention to provide a machine condition diagnostic system which is capable of monitoring the bearing lubricant over extended periods of tme to detect instances of excessive component wear, as well as being able to pinpoint the exact location of an existing or pending malfunction so that maintenance can be accomplished in much shorter periods of time while incurrin9 lower costs.

SUMMARY OF THE INVENTION

The present invention discloses a machine condition diagnostic system for use in a machine having an internal lubrication system, consisting of a lubricant monitor used in conjunction with machine components which are labelled with function specific wear indicators. A typical monitored component would be a single lubricated bearing. Alternatively, a plurality of bearings involved with a particular machine function, for example, drive shaft box bearings, would be labelled with the same indicator so that the presence of that indicator in the lubricant in abnormal amounts would indicate a malfunction in the bearings of that particular section of the machine. All replacement bearings would contain the same indicator to assure continuity of the system.

The machine condition diagnostic system of the present invention comprises uniformly distributing a distinctive trace element within selected components so that the component or components performing a specific function all have the same indicator; establishing normal levels of indicators in the lubricant; and monitoring the lubricant on a periodic or continuous basis to detect increases in the indicator level. If the level of indicators does in fact exceed normal levels, a sample of the lubricant is analyzed by methods capable of ascertaining the identity of the indicator and the location of the malfunctioning component.

Thus, the machine condition diagnostic system of the present invention enables machine operators to continually monitor machine condition and accurately locate malfunctioning components in order to more efficiently maintain machine operation.

BRIEF DESCRIPTION OF THE DRAWINGS

The invention and its many attendant objects and advantages will become better understood by reference to the following detailed description of he preferred embodiment when read in conjunction with the following drawings, wherein.

DESCRIPTION OF THE PREFERRED EMBODIMENTS

Figure 1:
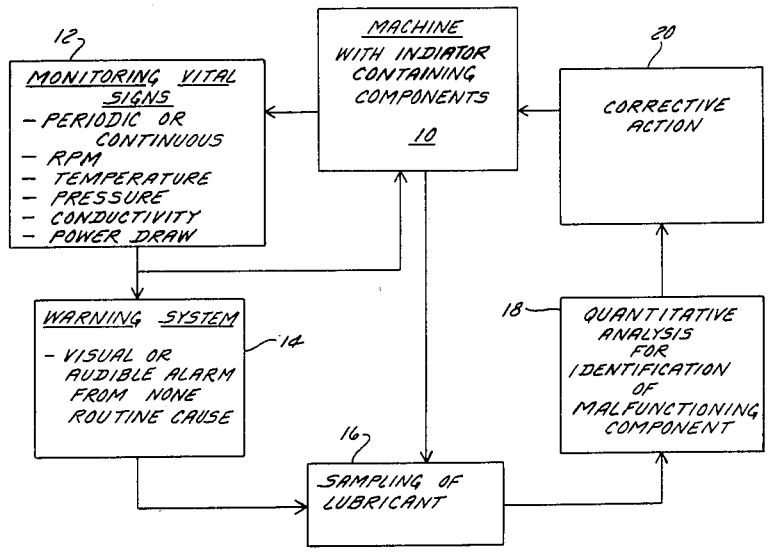
FIG. 1 is a schematic illustration of the machine condition diagnostic system of the present invention.

Referring now to FIG. 1, a machine bearing condition diagnostic system is shown comprising a machine 10 having an internal lubrication system and a machine condition monitoring system 12 which is capable of either periodically or continually monitoring machine vital signs such as component RPM, oil temperature, oil pressure, oil level in the oil holding tank, power draw and the time that various machine components continue moving after power to the machine has been cut off.

The present system can also be used with existing devices capable of sensing a change in the dielectric constant of the lubricant, in this case lubricating oil. This dielectric analysis is applicable to the present invention because it provides the capability of sensing the presence of location-specific metallic trace elements in the lubricating oil. As the level of metallic particles carried in the oil varies, the conductivity changes. This change in conductivity is measured and compared with a predetermined value.

When conductivity values indicate a level of metallic tracer particles which deviates from the preset level, an alarm 14 is triggered. In the case of the other monitored machine vital signs, an unacceptable variation in any one function triggers either the same alarm or a function-specific alarm which indicates the presence of an imminent malfunction.

Figure 3A:
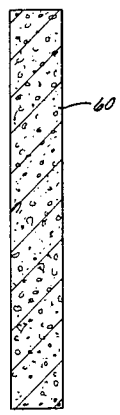
FIG. 3a is a sectional elevation of a bearing from a machine embodying the present invention wherein the machine condition indicator is uniformly distributed throughout the bearing.

The machine 10 to be monitored is fitted with components such as bearings within which trace element indicators 60 have been uniformly distributed (see FIG. 3a). The indicator materials comprise on the order of 1% of component mass.

Although the present system can be utilized with bearings made of various materials, in the case of bronze or brass bearings or bushings, the indicators may be added to the bearing material during the casting process. Preferred indicators for bronze or brass bearings include but are not restricted to aluminum, beryllium, bismuth, carbon, cobalt, chromium and zirconium. However, indicators may be any traceable element or compound which can be uniformly distributed within a bearing without affecting its performance. Radioactive indicators may also be used.

Figure 2:
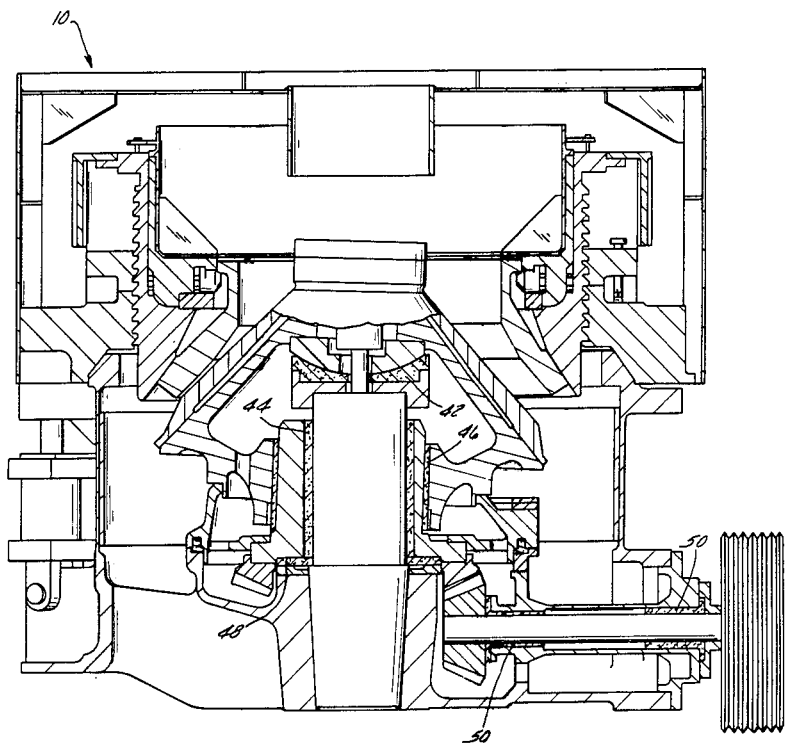
FIG. 2 is a sectional elevation of a rock crusher, indicating the various locations where function-specific trace elements would be placed.

Referring to FIG. 2, a rock crusher 10 embodying the present invention would have distinct indicator elements distributed in a function-specific arrangement. For example, the socket liner 42 would be labelled with beryllium as its indicator, head bushing 44 with bismuth, eccentric bushing 46 with cobalt, and thrustplate bearing 48 with zirconium. Alternatively, distinct indicator elements could be assigned to designated classes of components, such as labelling all countershaft bushings 50 with chromium. Replacement bearings would contain the same indicator materials to assure continuity of the system.

Since many machine components are fabricated from multi-element alloys, it may be difficult to totally exclude a particular trace element from components which have another trace element as their indicator. Nonetheless, those components used in machines utilizing the present system will be fabricated in such a way as to minimize the presence of unwanted trace elements.

During normal use, bearings will wear to a certain extent, so that a certain amount of indicator will always be present in the lubricating oil. The alarm component 14 of the present invention is designed to be triggered by unacceptable variations in the amount of indicator metal present in the lubricating oil.

Since the amount of bearing wear will vary with the demands of each user, once a new machine has been placed in operation, or a new set of bearings is installed in an existing machine, normal levels of indicator material in the lubricant will be determined by sampling and analyzing the lubricant at predesignated intervals such as after one month or a designated number of hours of use. The amount of indicator found in the initial sample will constitute the benchmark from which further wear will be measured. There is also the possibility that in some instances, an older machine will wear at a different rate, so that new benchmarks will have to be set when the machine reaches a predesignated age.

Figure 3B:
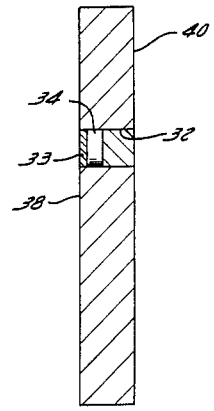
FIG. 3b is a sectional elevation of a bearing from a machine embodying the present invention wherein the machine condition indicator is a trace element pill embedded in the bearing wall.

Referring now to FIG. 3b, an alternative embodiment of the present invention would involve the substitution of uniformly distributed trace element indicators in each bearing with the drilling of a bore 32 into the race surface of each bearing to beyond the depth of the maximum acceptable wear, which is usually in the range of about 1/16th of an inch. Next, a pill 34 comprised of an indicator material is securely placed into the bottom of the bore. The pill may alternately be inserted into the bearing through the race area 38 or from the exterior 40. The bore 32 is then sealed up with a sealant 33 such as lead. In most situations, the sealant need not match the wear properties of the bearing material because the amount of bearing-shaft contact is significantly greater than the cross-sectional area of the bore 32, and the bore area will not be subjected to extraordinary amounts of wear. When the level of bearing wear approaches the unacceptable level, the pill will be uncovered, releasing the indicator into the oil. In the case of bearings which are subject to uneven wear, a plurality of indicator pills may be located around the inner periphery of the bearing.

Figure 3C:
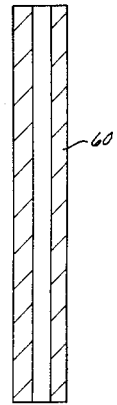
FIG. 3c is a sectional elevation of a bearing from a machine embodying the present invention wherein the machine condition indicator is one of several laminated layers which comprise the bearing.

Referring to FIG. 3c, the bearing may also be manufactured in laminar fashion with the indicator material 60 restricted to a separate layer which is exposed whenever wear exceeds acceptable limits.

Aside from the utilization of indicator pills, or other methods of distributing the indicator material within the monitored component, the operation of alternate embodiments is identical to that of the preferred embodiment.

All of the above-mentioned monitored machine functions such as oil pressure and temperature, shaft RPM, power draw or dielectric constant have pre-set acceptable parameters within which the machine normally operates. If any of the monitors detect an unacceptable variation in any of the pre-set parameters, the system is designed to alert the operator by means of an alarm 14 in the form of a written printout, an audible signal such as a bell, or a flashing light.

In conventional systems, once the alarm is triggered, the operator only knows that a malfunction has been detected. In the present invention, once alarm 14 is triggered and a bearing failure is suspected, the operator removes a sample of the lubricant 16. The amount of lubricant in the sample will vary from machine to machine; however, anywhere from one pint to one quart will be acceptable. In the case of machines not fitted with automatic vital sign monitoring systems, lubricant can still be sampled on a periodic basis as a preventive measure.

The sample then undergoes analysis, 18 such as by spectrochemical means, to determine the identity of various contaminants contained therein. The type of analytical method will vary with the individual characteristics of the various indicator elements. The analysis will reveal the presence of excessive amounts of trace elements corresponding to one or more locations in the machine where excessive bearing wear is occurring. The operator merely has to coordinate the material found in the analysis with the functional section of the machine associated with that particular indicator. Appropriate repair and/or replacement of malfunctioning parts 20 can then be readily accomplished, in many instances avoiding catastrophic failure and minimizing downtime and failure cost.

When the system of the present invention is in place, malfunctioning components are located in the following manner. In the event that any one or a combination of the monitored machine vital signs such as oil pressure or temperature, shaft RPM, power draw or lubricant dielectric constant indicate an abnormal rate of wear, the appropriate alarm will be activated.

If normal alarm causes are eliminated, the machine operator will then remove a sample of lubricant and have it analyzed via spectrochemical or other means. The results of the analysis will identify and quantify the various indicator contaminants. Those indicators whose levels deviate from predetermined values will be noted and correlated with their corresponding machine function to identify the malfunctioning component or components.

Thus, the present invention provides a machine condition diagnostic system which is capable of monitoring the condition of lubricant and pinpointing malfunctioning components so that machine down time is minimized and repairs are accomplished more efficiently. While a particular embodiment of this process has been described, it will be obvious to persons skilled in the art that changes and modifications might be made without departing from the invention in its broader aspects. It is the aim of the dependent claims to cover all such changes and modifications as fall within the true scope and spirit of the invention.

What is claimed is:

1. In a system for monitoring a machine having an internal lubrication system and various replaceable wearable components, such that the lubricant is common to all components, the process of monitoring the condition of machine lubricant to pinpoint malfunctioning components comprising:
   (a) distributing a distinct trace element indicator material in each wearable component;
   (b) establishing acceptable cumulative levels of indicators from all wearable components in said lubricant;
   (c) sampling said lubricant; and
   (d) analyzing said sample of said lubricant by means capable of distinguishing between various indicators to detect the presence and changes in the amount of the particular indicator or indicators which signify a specific malfunctioning component.

2. The machine condition diagnostic system described in claim 1, wherein said lubricant is monitored for an unacceptable change in the amount of indicators by measuring changes in the dielectric constant of said lubricant to determine whether sampling is required.

3. The machine condition diagnostic system described in claim 2, further comprising the demonstration of unacceptable change by warning means.

4. The machine condition diagnostic system defined in claim 1, wherein said indicator-bearing components are bearings.

5. The machine condition diagnostic system defined in claim 1, wherein the condition of said lubricant is monitored on a periodic basis.

6. The machine condition diagnostic system defined in claim 1, wherein said sample is analyzed by spectrochemical means.

7. The machine condition diagnostic system defined in claim 1, wherein said trace element indicator material is distributed in each wearable component in the form of a laminated layer.

8. The process of monitoring the condition of bearing lubricant to pinpoint malfunctioning machine components comprising:
   (a) uniform distributing a distinct trace element indicator material in each type of bearing, so that the bearing or bearings performing a specific function such as main shaft bearings, all have the same indicator;
   (b) establishing acceptable levels of trace elements in the bearing lubricant;
   (c) monitoring said bearing lubricant for an unacceptable change in the level of contaminants by measuring changes in the dielectric constant of the lubricant;
   (d) demonstrating said unacceptable change by warning means;
   (e) sampling said lubricant; and
   (f) analyzing said sample of said lubricant by spectrochemical analysis or other means capable of detecting the presence of the particular indicator or indicators which signify a specific malfunctioning bearing or bearings.

9. The process of monitoring machine bearing lubricant condition to pinpoint malfunctioning bearings comprising:
   (a) drilling a bore into the race surface of each bearing in a machine to beyond the depth of maximum acceptable wear;
   (b) inserting a pill comprised of an indicator material into the bottom of said bore so that each bearing function is represented by a different indicator pill;
   (c) sealing said bore;
   (d) establishing acceptable levels of indicator materials in the bearing lubricant;
   (e) monitoring said lubricant for an unacceptable change in the level of contaminants;
   (f) sampling said lubricant; and
   (g) analyzing said sample of said unacceptably contaminated lubricant by quantitative chemical analysis to detect the presence of the particular indicator or materials, which identify a specific malfunctioning component.

10. The process of monitoring bearing condition defined in claim 9 wherein the monitoring of said bearing lubricant is accomplished by measuring the change in the dielectric constant of said lubricant.

11. The bearing condition diagnostic system described in claim 9 wherein said monitoring is carried out on a periodic basis.

12. The bearing condition diagnostic system of claim 9 wherein said analysis of samples is accomplished by spectrochemical or other means capable of detecting the presence of the particular indicator or indicators which signify a specific malfunctioning bearing or bearings.

* * * * *